(12) United States Patent
Yeh (10) Patent No.: US 6,955,576 B2
(45) Date of Patent: Oct. 18, 2005

(54) SLIDER

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 0 days.

(21) Appl. No.: 10/386,634

(22) Filed: Mar. 13, 2003

(65) Prior Publication Data

US 2003/0224675 A1 Dec. 4, 2003

Related U.S. Application Data

(63) Continuation-in-part of application No. 10/040,404, filed on Jan. 9, 2002, now abandoned.

(51) Int. Cl.$^7$ .............................................. B63B 1/00
(52) U.S. Cl. ........................................ 441/65; 441/74
(58) Field of Search ............................ 441/65, 74, 70

(56) References Cited

U.S. PATENT DOCUMENTS

| | | | | |
|---|---|---|---|---|
| 4,457,729 A | * | 7/1984 | Peerlkamp | 441/74 |
| 5,211,593 A | * | 5/1993 | Schneider et al. | 441/65 |
| 5,224,890 A | * | 7/1993 | Moran | 441/65 |
| 5,618,215 A | * | 4/1997 | Glydon | 441/65 |
| 5,647,784 A | * | 7/1997 | Moran | 441/65 |
| 5,658,179 A | * | 8/1997 | Glydon et al. | 441/74 |
| 5,797,779 A | * | 8/1998 | Stewart | 441/74 |
| 5,928,045 A | * | 7/1999 | Szabad | 441/74 |
| 6,106,345 A | * | 8/2000 | Yeh | 441/65 |
| 6,109,991 A | * | 8/2000 | McClaskey | 441/70 |

* cited by examiner

Primary Examiner—Lars A. Olson
(74) Attorney, Agent, or Firm—Charles C. H. Wu; Wu & Cheung, LLP (57) ABSTRACT

A slider that can resist corrosion of moisture, dirt and ultraviolet of sunlight and prevent the pattern therein from wear and tear. The slider also provides a smooth touching feeling to users. The slider mainly containing: a polyethylene foaming board, a first polyethylene foaming skin, a first plastic film, a second polyethylene foaming skin and a second plastic film. The polyethylene foaming board having a top surface, a bottom surface and edge surfaces. The first polyethylene foaming skin contains an inner surface and an outer surface. The inner surface of the first polyethylene foaming skin is bonded with the top surface and the edge surfaces of the polyethylene foaming board. The first polyethylene foaming skin has a foaming rate less than a foaming rate of the polyethylene foaming board. The first plastic film is bonded with the outer surface of the first polyethylene foaming skin. The second polyethylene foaming skin contains an inner surface and an outer surface. The inner surface of the second polyethylene foaming skin is bonded with the bottom surface of the polyethylene foaming board. The second polyethylene foaming skin has a foaming rate less than the foaming rate of the polyethylene foaming board. The second plastic film is bonded with the outer surface of the second polyethylene foaming skin.

13 Claims, 9 Drawing Sheets

SLIDER

The present invention is a continuation-in-part application of the U.S. Ser. No. 10/040,404, application filed on Jan. 9, 2002, now abandoned.

TECHNICAL FIELD

This invention relates generally to a slider, in particular, to provide a slider having at least one protective layer protecting the foaming material of the slider from corrosion of moisture, dirt and ultraviolet of sunlight and the pattern on the slider from wear and tear.

The slider can be used as a bodyboard, a snowboard, a snow sled, a grass sliding board, sand sliding board or the like.

BACKGROUND OF THE INVENTION

A traditional slider used as a snowboard contains a board and two handles installed at two sides. The slider has pattern thereon. The traditional board is made of hardened plastic because hardened plastic is wear resistant. Although hardened plastic has a nature of wear resisting, users don't feel comfortable when physically contact with the board. The traditional slider is heavy, so it's not convenient for users especially children to carry it. Besides, the pattern printed on the board or the pattern on a sticker stamped on the board is easily worn out since it directly contacts human body, air and sunlight.

Another traditional slider is made of expended polyethylene. The main structure of the slider is a board. There are many "air-cells" in the board and the air-cells decide the weight feature of the board. For some bodyboards, an out layer is bonded on top of the board and several out strips are bonded around the surroundings of the board. The out layer and out strips are made of expended polyethylene at a foaming rate less than the foaming rate of the board. Therefore, the air-cells in the out layer are smaller than the air-cells in the board. A slider made of expended polyethylene is more comfortable compared to hardened plastic. However, the out layer and the out strips could be broken under the sunshine for a period of time. It is known that the ultraviolet will result the damage of the expended polyethylene. The air-cells on the surfaces of the out layer and the out strips are fragile when frictionized. Once the air-cells in or on the out layer are broken, water will retained in the dents formed by the broken air-cells and therefore reduce the life and workability of the board. Furthermore, the pattern on the slider can only be printed on the out layer and the out strips. Therefore, the pattern will fade under the sunshine quickly.

The wear and tear of a slider is significant if used frequently. When doing snow sliding, surfing, or grass sliding, users would like to have comfortable touch feelings with the slider. The pattern or pictures on sliders are easy for the owners to identify their own sliders. Users of sliders also don't like the pattern to be worn out quickly. Therefore a slider that can provide users comfortable touch and can reduce the wear and tear of the board is needed.

SUMMARY OF INVENTION

It is therefore primary objective of the present invention to provide a slider that can resist corrosion of moisture, dirt and ultraviolet of sunlight at all sides.

Another object of the invention is to provide a slider that can prevent the pattern on the slider from wear and tear.

Further object of the invention is to provide a slider with smooth touching feeling surfaces.

The present invention, briefly summarized, in one embodiment discloses a slider mainly containing: a polyethylene foaming board, a first polyethylene foaming skin, a first plastic film, a second polyethylene foaming skin and a second plastic film. The polyethylene foaming board having a top surface, a bottom surface and edge surfaces. The first polyethylene foaming skin contains an inner surface bonded with the top surface and the edge surfaces of the polyethylene foaming board and an outer surface. The first polyethylene foaming skin has a foaming rate less than a foaming rate of the polyethylene foaming board. The first plastic film is bonded with the outer surface of the first polyethylene foaming skin. The second polyethylene foaming skin contains an inner surface bonded with the bottom surface of the polyethylene foaming board and an outer surface. The second polyethylene foaming skin has a foaming rate less than the foaming rate of the polyethylene foaming board. The second plastic film is bonded with the outer surface of the second polyethylene foaming skin. The first plastic film contains an outer film and an inner film. The outer film contains an inner surface having a pattern thereon. The outer film is pervious to light. The inner film contains an outer surface and an inner surface. The outer surface of the inner film is bonded with the inner surface of the outer film. The inner surface of the inner film is bonded with the polyethylene foaming board.

BRIEF DESCRIPTION OF DRAWINGS

The invention will be more clearly understood after refer to the following detailed description read in conjunction with the drawings wherein.

DETAILED DESCRIPTION OF PREFERRED EMBODIMENTS

Figure 1:
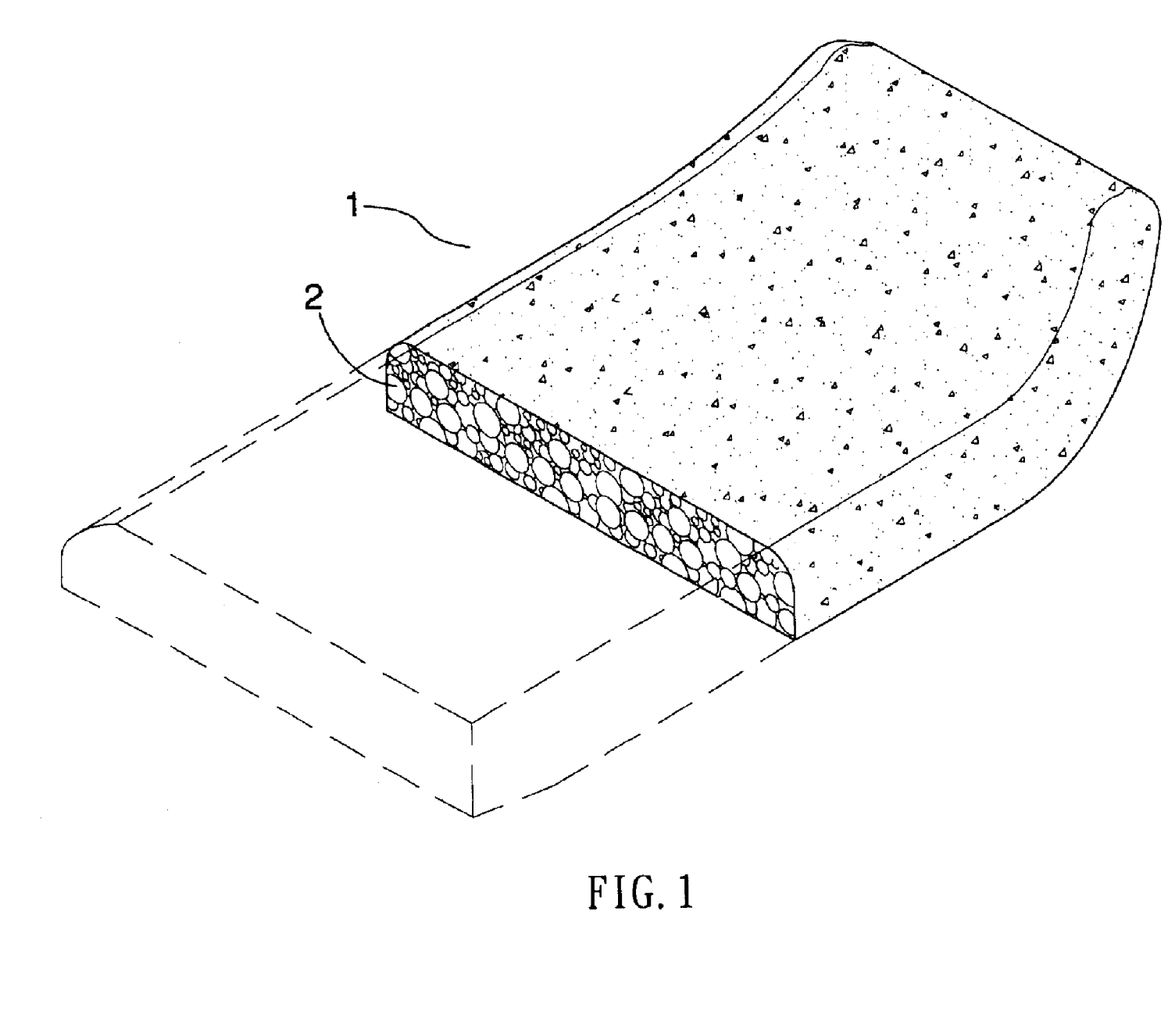
FIG. 1 is a perspective view of a polyethylene foaming board of an embodiment.

FIG. 1 illustrates a polyethylene foaming board 1 of the following embodiments. The polyethylene foaming board 1 is made of a foamable material. The polyethylene foaming board 1 has a foaming value from 1.2 PCF to 2.4 PCF, wherein PCF is foaming value meaning a weight per cube foot. The higher foaming rate, the lower foaming value. The polyethylene foaming board 1 contains plural cells 2. Each of the cells 2 has a diameter from 1 to 3 mm.

Figures 2, 2A:
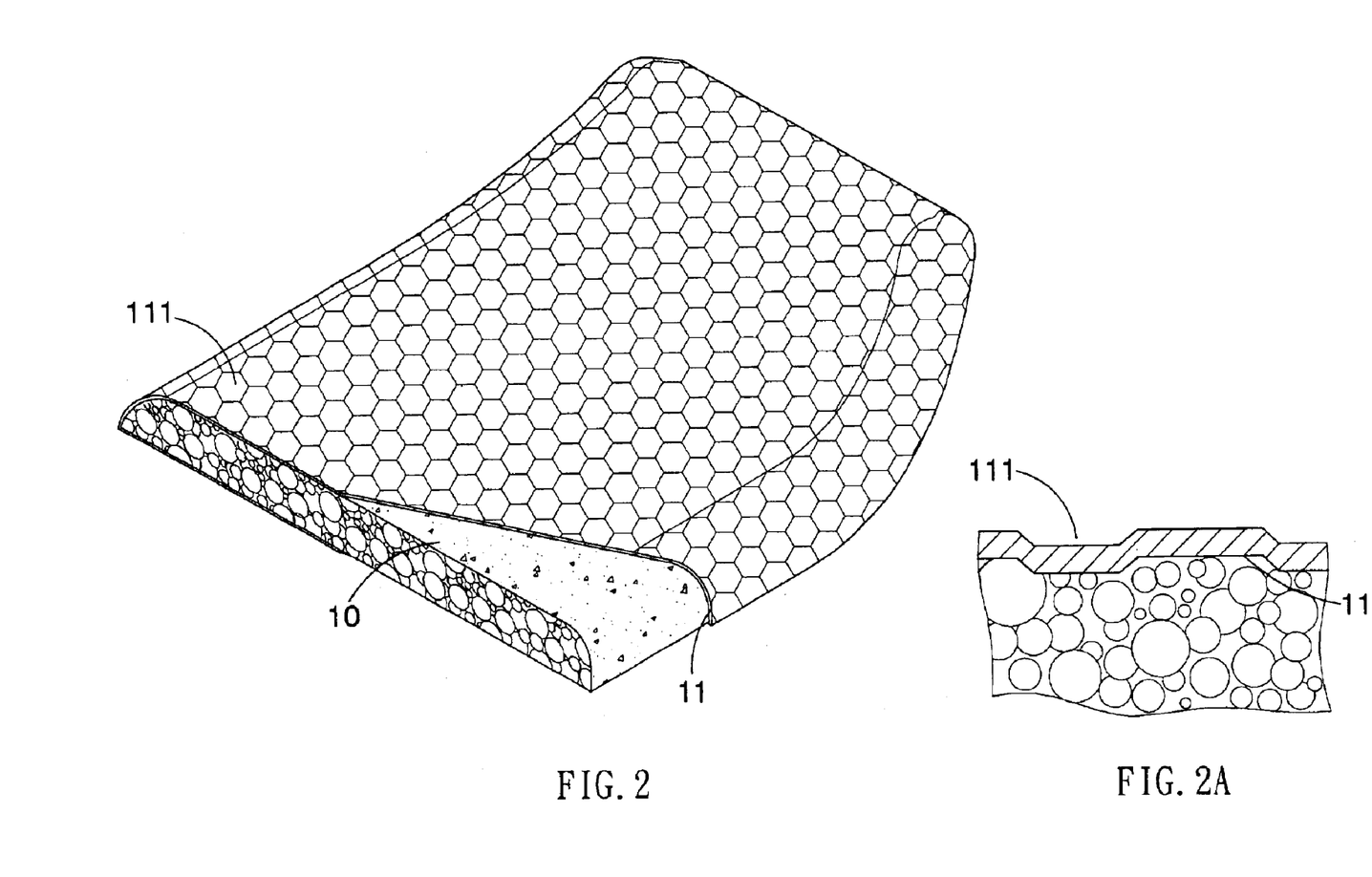
FIG. 2 is a perspective view of the first embodiment.
FIG. 2A is an enlarged cross sectional view of the first embodiment.

FIG. 2 illustrates the first embodiment of the present invention. The embodiment contains a polyethylene foaming board 10 and a plastic film 11 encapsulating and bonding with the polyethylene foaming board 10. The plastic film 11 has plural small concaves 111 on both sides. The polyethylene foaming board 10 is united with the concaves 111 at the inner side of the plastic film 11. Thereby the bonding surface between the plastic film 11 and the polyethylene foaming board 10 is increased. Accordingly the bonding strength is greatly increased. The plastic film 11 can prevent the ultraviolet rays of the sunshine from directly projecting on the polyethylene foaming board 10 and moisture from directly contacting the polyethylene foaming board 10. The concaves 111 at the outer side of the plastic film 11 can provide stronger traction between human body and the outer side of the plastic film, so users of the slider can hold on the slider firmly.

Figure 3:
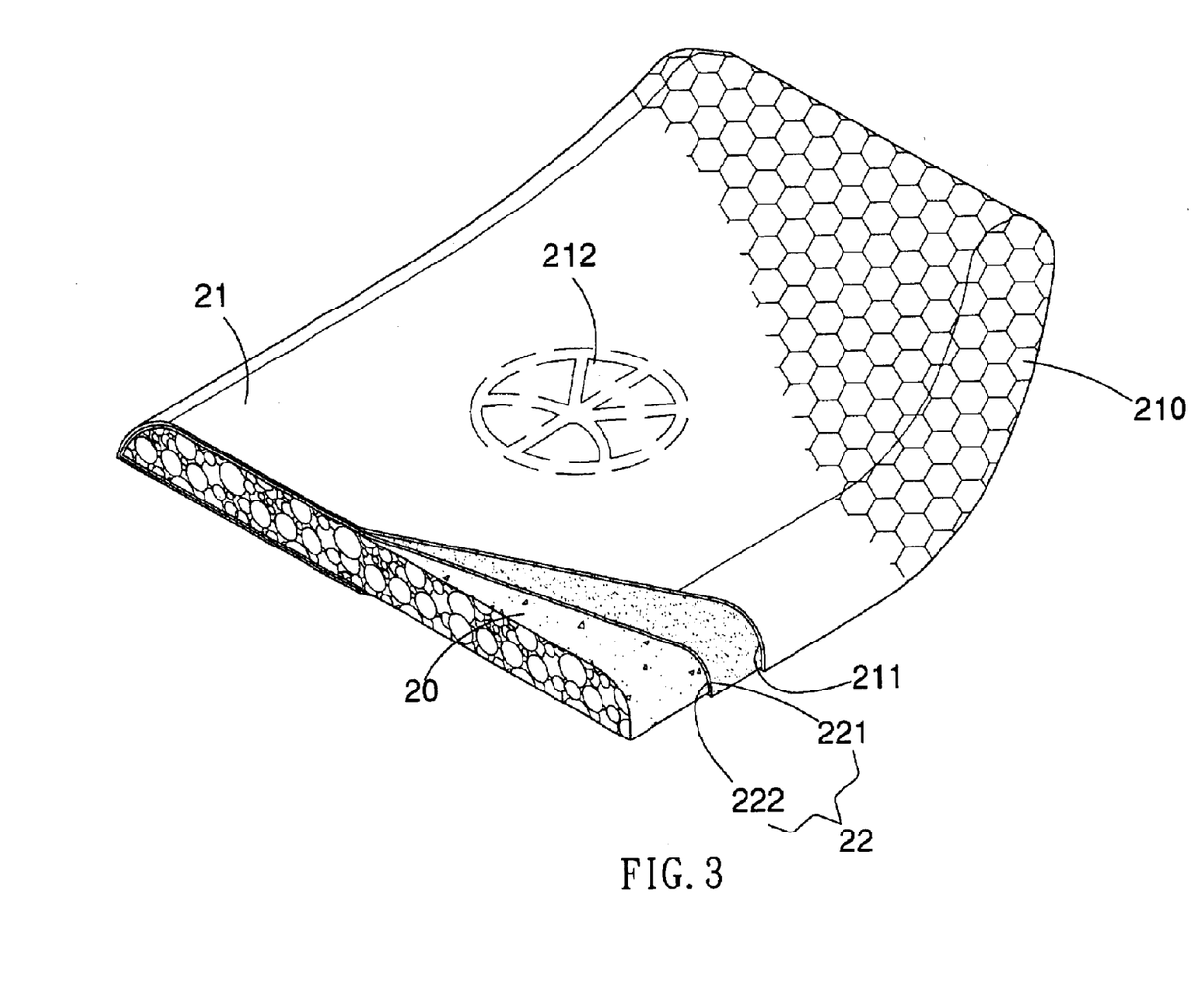
FIG. 3 is a perspective view of the second embodiment.

With reference to FIG. 3, the second embodiment of the present invention contains a polyethylene foaming board 20, an outer film 21 and an inner film 22. The outer film 21 contains an inner surface 211 having a pattern 212 thereon. The outer film 21 is pervious to light, so the pattern 212 can be seen through. The inner film 22 contains an outer surface 221 and an inner surface 222. The outer surface 221 of the first inner film 22 is bonded with the inner surface 211 of the outer film 21 including the pattern 212. The inner surface 222 of the first inner film 22 is bonded with the polyethylene foaming board 20. The outer film 21 together with the inner film 22 have plural concaves 210 on the outer surface of the outer film 21 and on the inner surface 222 of the inner film 22. The polyethylene foaming board 20 is united with the concaves 210 at the inner surface 222 of the inner film 22. Thereby the pattern 212 is protected by the outer film 21 from wear and tear. The cells of the polyethylene foaming board 20 are double protected by the outer film 21 and the inner film 22.

Because the outer film 21 directly contact sunlight and airs and for proving enough strength in order the pattern can be printed on, the thickness of the outer film 21 is preferably thicker than the thickness of the inner film 22. The thinner inner film 22 is more suitable for being heat laminated to the polyethylene foaming board 20 than is a thicker one. The inner film 22 is extrude coated or pasted on the inner surface 222 of the inner film 22. The thickness of the outer film is preferably from 0.02 mm to 0.15 mm and the thickness of the inner film is preferably from 0.01 mm to 0.15 mm.

Figure 4:
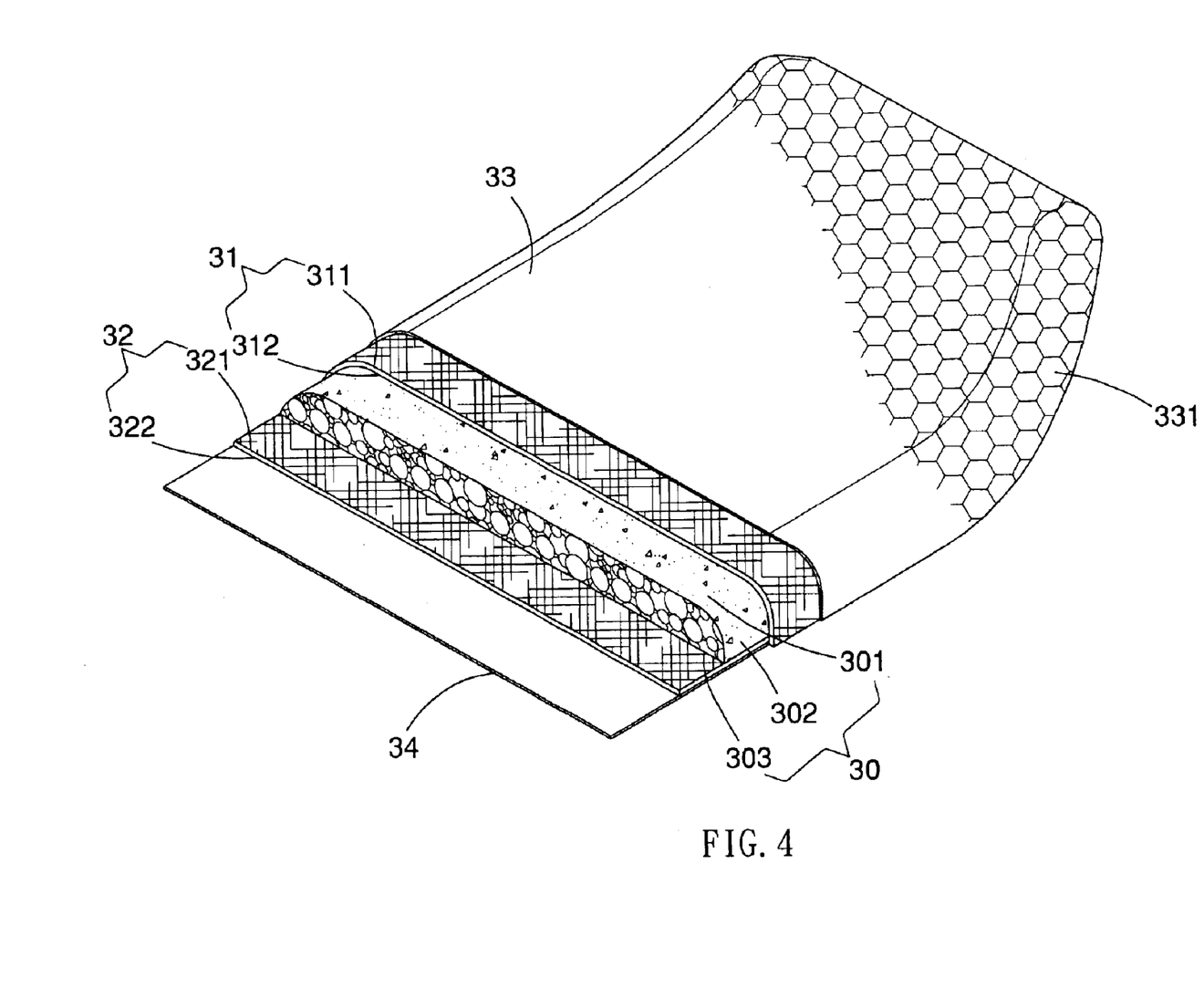
FIG. 4 is a perspective view of the third embodiment containing two polyethylene foaming skins.

With reference to FIG. 4, the third embodiment of the present invention contains a polyethylene foaming board 30, a first polyethylene foaming skin 31, a first plastic film 33, a second polyethylene foaming skin 32 and a second plastic film 34.
The polyethylene foaming board 30 has a top surface 301, a bottom surface 303 and edge surfaces 302. The first polyethylene foaming skin 31 contains an inner surface 312 bonded with the top surface 301 and the edge surfaces 302 of the polyethylene foaming board 30, and an outer surface 311. The first polyethylene foaming skin 31 has a foaming rate less than a foaming rate of the polyethylene foaming board 30. The first plastic film 33 is bonded with the outer surface 311 of the first polyethylene foaming skin 31. The second polyethylene foaming skin 32 contains an inner surface 321 bonded with the bottom surface 303 of the polyethylene foaming board 30, and an outer surface 322. The second polyethylene foaming skin 32 has a foaming rate less than the foaming rate of the polyethylene foaming board 30. The second plastic film 34 is bonded with the outer surface 322 of the second polyethylene foaming skin 32. The first plastic film 33 has plural concaves 331 on both surfaces. The concaves 331 of inner surface of the first plastic film is united with the first polyethylene foaming skin 31 for providing more bonding surface. The thickness of the second plastic film 34 is greater than the thickness of the first plastic film 33. The thickness of the first plastic film is preferably from 0.02 mm to 0.15 mm and the thickness of the second plastic film is preferably from 0.3 mm to 1.5 mm. When the slider is used as a snowboard or the like, the bottom surface need stronger resistance against friction, the second plastic film can have a thickness more than 1.5 mm.

Figure 5:
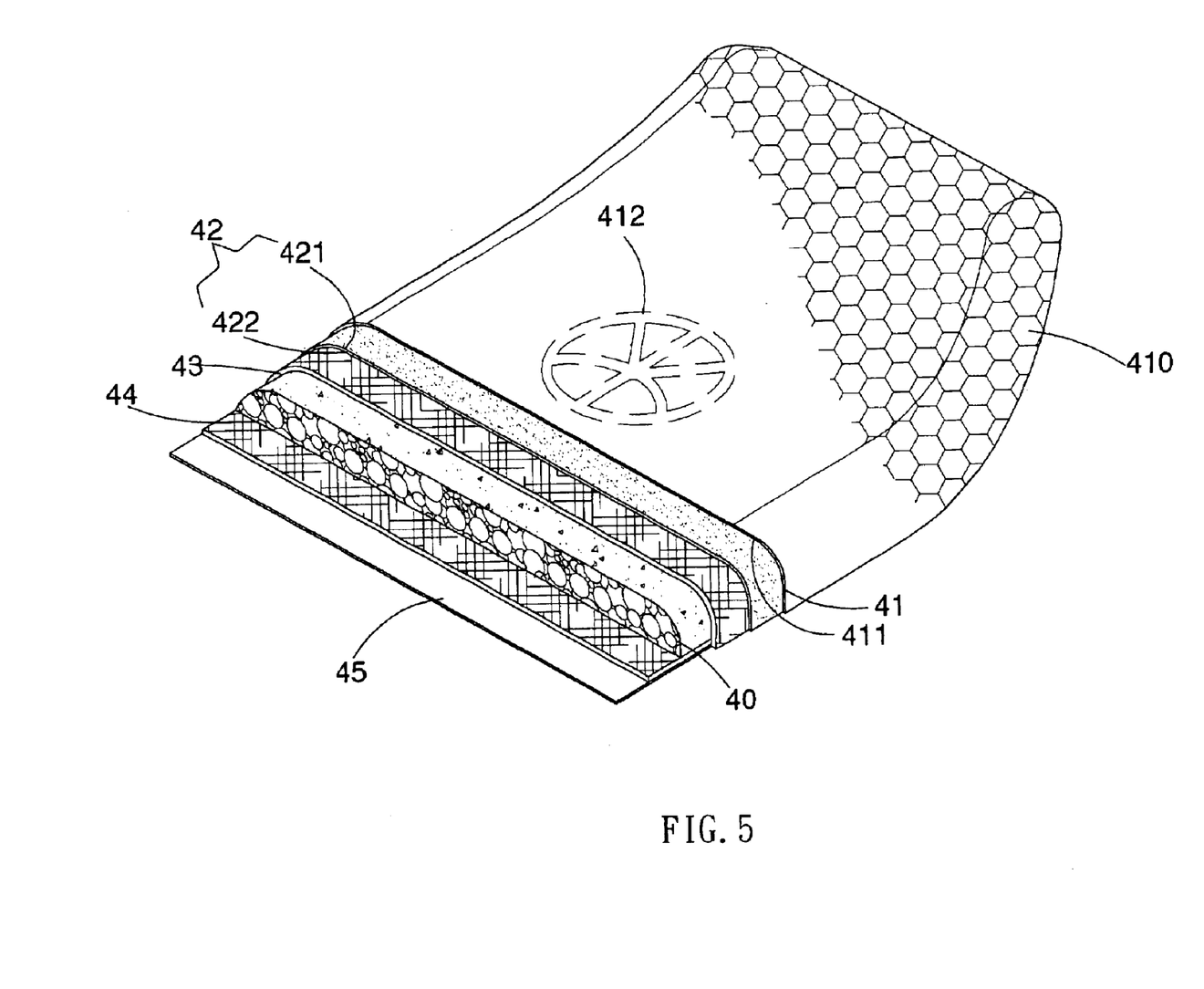
FIG. 5 is a perspective view of the fourth embodiment.

With reference to FIG. 5, the fourth embodiment of the present invention contains all the elements and same structure of the third embodiment. The fourth embodiment contains a polyethylene foaming board 40, a first polyethylene foaming skin 43, a first plastic film, a second polyethylene foaming skin 44 and a second plastic film 45, wherein the first plastic film contains an outer film 41 and an inner film 42. The outer film 41 contains an inner surface 411 having a pattern 412 thereon. The outer film 41 is pervious to light, so the pattern 412 can be seen through. The inner film 42 contains an outer surface 421 and an inner surface 422. The outer surface 421 of the first inner film 42 is bonded with the inner surface 411 of the outer film 41. The inner surface 422 of the first inner film 42 is bonded with the first polyethylene foaming skin 43. The outer film 41 together with the inner film 42 have plural concaves 410 on the outer surface of the outer film 41 and on the inner surface 422 of the inner film 42. The first polyethylene foaming skin 43 is united with the concaves 410 at the inner surface 422 of the inner film 42. The thickness of the outer film 41 is preferably greater than the thickness of the inner film 42. The thickness of the outer film is preferably from 0.02 mm to 0.15 mm and the thickness of the outer film is preferably from 0.01 mm to 0.15 mm.

The polyethylene foaming skins described in the embodiments of FIG. 4 and FIG. 5 have foaming rates lower than the foaming rates of the polyethylene foaming boards (the polyethylene foaming skins have higher foaming value than the foaming value of the polyethylene foaming boards). The foaming value of the polyethylene foaming skins has the foaming value from 2.5 PCF to 8 PCF. The diameters of the cells in the polyethylene foaming skins is less or equal to 0.5 mm. Since the polyethylene foaming skins have lower foaming rate, the polyethylene foaming skins have smoother surfaces than the surfaces of the polyethylene foaming boards. Because the plastic films are comparably thin, human bodies can feel the smoothness of the polyethylene foaming skins. In addition, the polyethylene foaming skins and the polyethylene foaming boards are of similar materials, so they can be easily bonded together.

Figure 6:
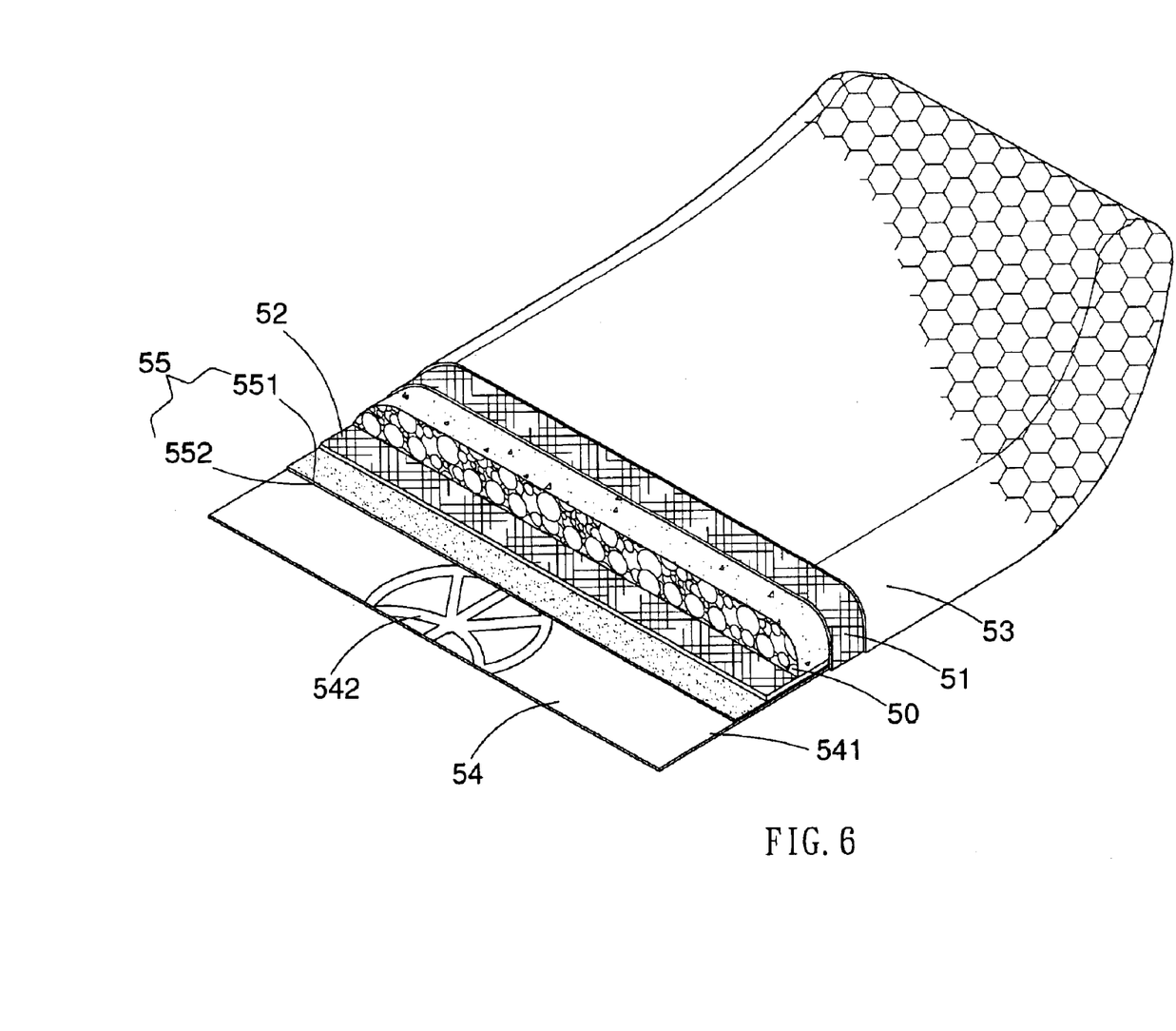
FIG. 6 is a perspective view of the fifth embodiment.

With reference to FIG. 6, the fifth embodiment of the present invention contains all the elements and same structure of the third embodiment. The fifth embodiment contains a polyethylene foaming board 50, a first polyethylene foaming skin 51, a first plastic film 53, a second polyethylene foaming skin 52 and a second plastic film, wherein the second plastic film contains an outer film 54 and an inner film 55. The outer film 54 contains an inner surface 541 having a pattern 542 thereon. The outer film 54 is pervious to light, so the pattern 542 can be seen through. The inner film 55 contains an outer surface 552 and an inner surface 551. The outer surface 552 of the second inner film 55 is bonded with the inner surface 541 of the outer film 54. The inner surface 551 of the inner film 55 is bonded with the second polyethylene foaming skin 52. The thickness of the second plastic film consisted of the outer film 54 and the inner film 55 is preferably from 0.3 mm to 1.5 mm.

Figure 7:
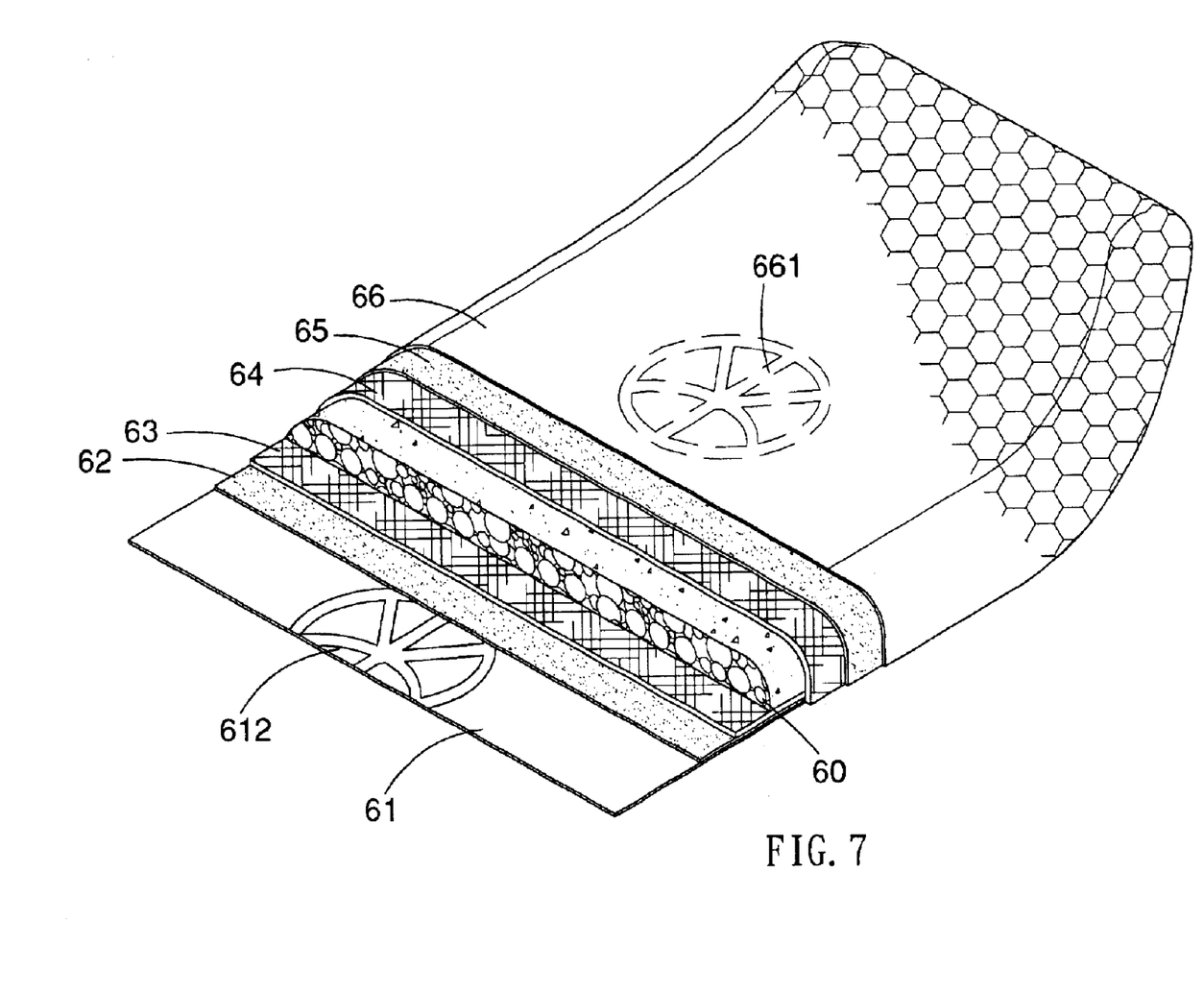
FIG. 7 is a perspective view of the sixth embodiment having two patterns.

FIG. 7 illustrates the sixth embodiment of the invention. The sixth embodiment combines the characters of the fourth and fifth embodiments. The sixth embodiment contains a polyethylene foaming board 60, a first polyethylene foaming skin 64, a first plastic film, a second polyethylene foaming skin 63 and a second plastic film, wherein the first plastic film contains a first outer film 66 having a first pattern 661 thereon and a first inner film 65 and the second plastic film contains a second outer film 61 having a second pattern 612 thereon and a second inner film 62. Therefore the both patterns can be properly protected.

Figure 8:
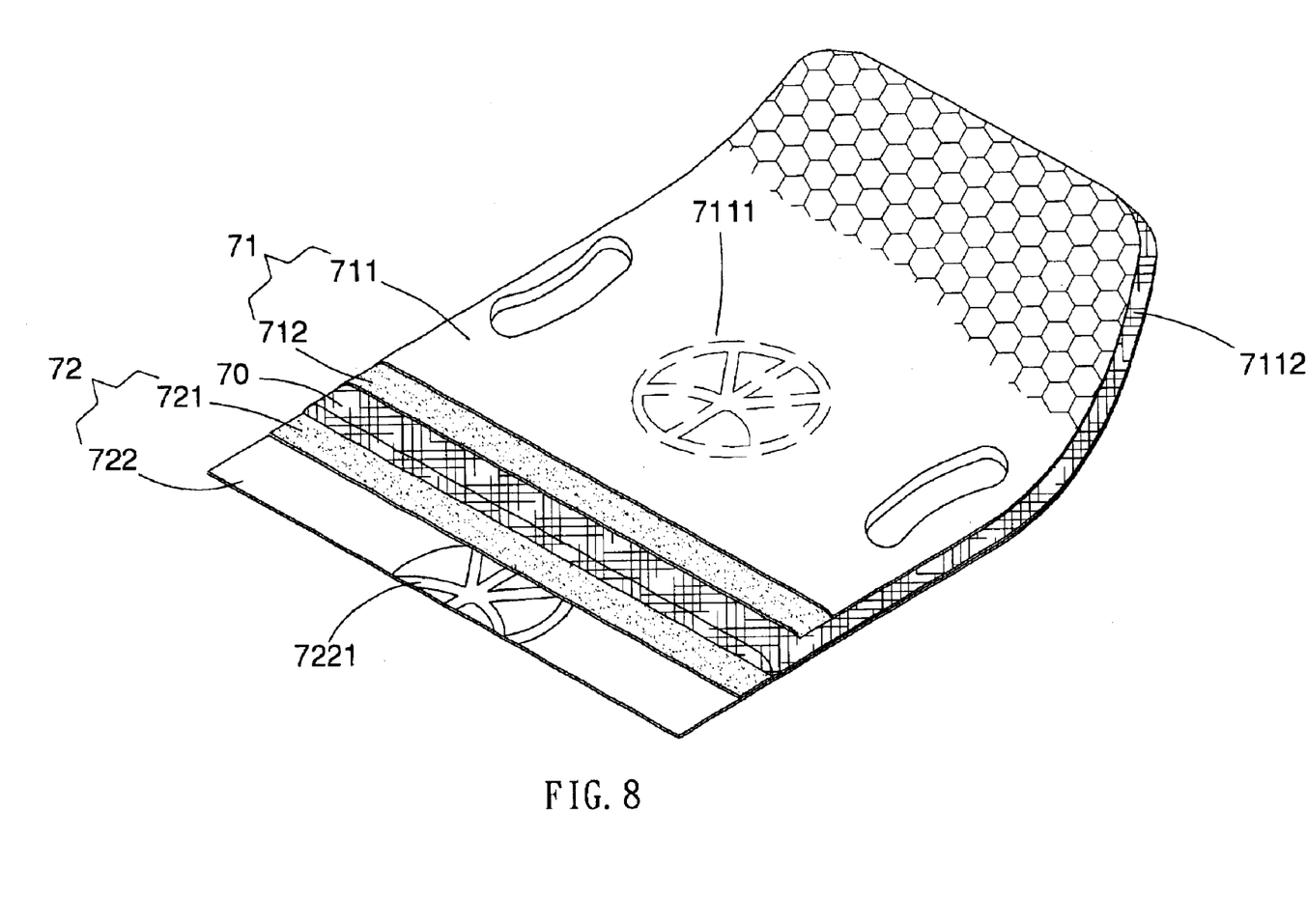
FIG. 8 is a perspective view of the seventh embodiment.

With reference to FIG. 8, the seventh embodiment mainly contains a first plastic film 71, a polyethylene foaming skin 70 and a second plastic film 72. The first plastic film 71 contains a first outer film 71 1and a first inner film 712. The first outer film 711 contains an inner surface having a first pattern 7111 thereon. The first outer film 711 is pervious to light. The first outer film 711 has a thickness from 0.02 mm to 0.15 mm. The first inner film 712 contains an outer surface and an inner surface, the outer surface of the first inner film 712 is bonded with the inner surface of the first outer film 711, the inner surface of the first inner film 712 is bonded with the polyethylene foaming skin 70. The first inner film has a thickness from 0.01 mm to 0.15 mm. The polyethylene foaming skin 70 contains an upper surface and a lower surface. The upper surface is bonded with the first plastic film. The polyethylene foaming skin 70 has a foaming value from 1.9 PCF to 6 PCF. The second plastic film 72 having an inner surface bonded with the lower surface of the polyethylene foaming skin 70. The second plastic film contains a second outer film 722 and a second inner film 721. The second outer film 722 contains an inner surface having a second pattern 7221 thereon. The second outer film is pervious to light. The second inner film 721 contains an outer surface and an inner surface. The outer surface of the second inner film 721 is bonded with the inner surface of the second outer film 722. The inner surface of the second inner film 721 is bonded with the lower surface of the polyethylene foaming skin 70. The second plastic film 72 has a thickness from 0.3 mm to 1.5 mm.

Figure 9:
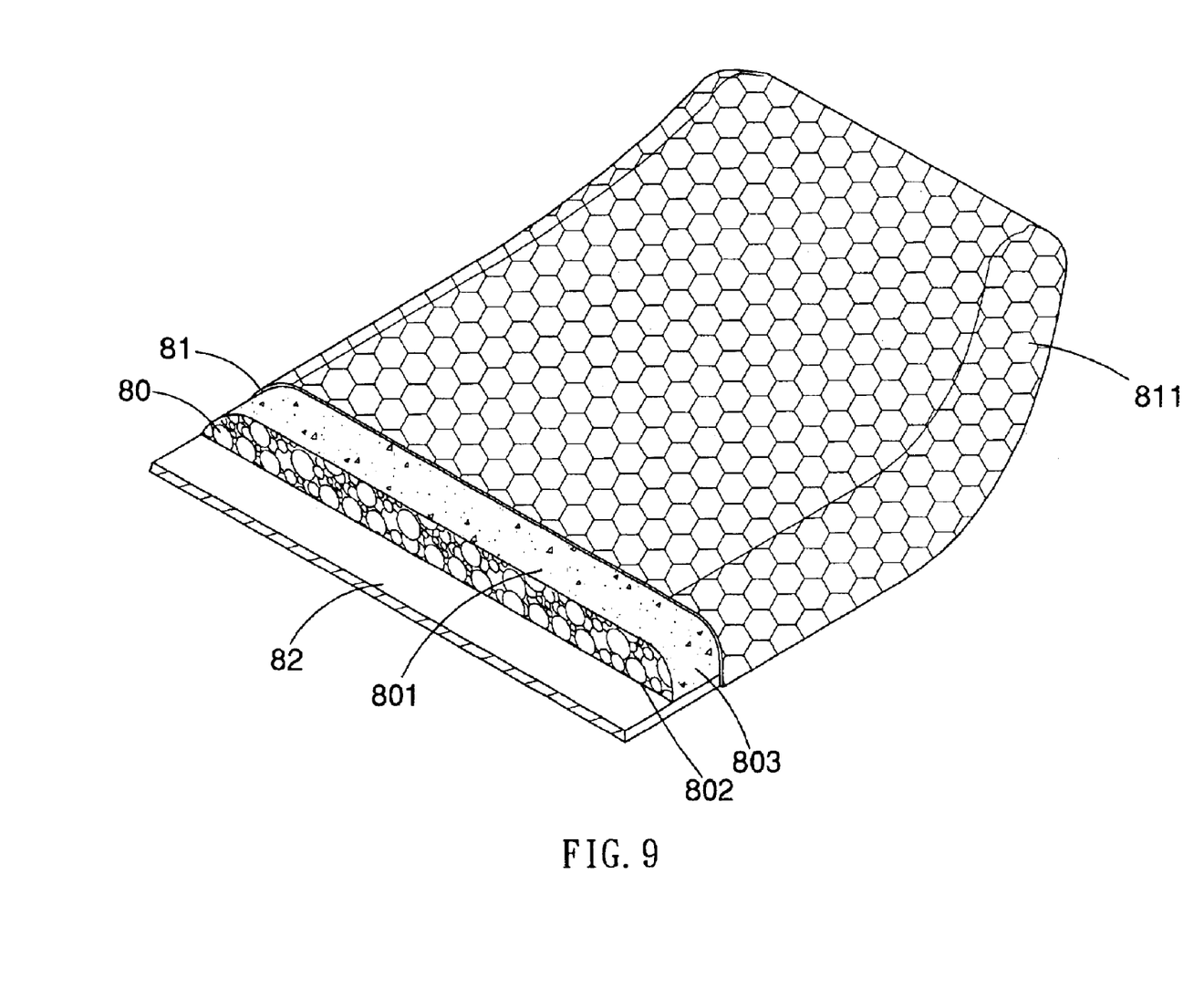
FIG. 9 is a perspective view of the eighth embodiment.

With reference to FIG. 9, the eighth embodiment as illustrated contains a polyethylene foaming board 80, a base plate 82 and a plastic film 81. The polyethylene foaming board 80 is formed of a foamed material. The polyethylene foaming board 80 has an upper surface 801, a bottom surface 802 and edge surfaces 803. The base plate 82 is bonded to the bottom surface 802 of the polyethylene foaming board 80. The base plate 82 has a stiffness greater than the stiffness of the polyethylene foaming board 80. The plastic film 81 directly and entirely encompasses the upper and edge surfaces 801, 803 of the polyethylene foaming board 80. The plastic film 81 has concaves 811 on both sides; the concaves 811 on an inner side of the plastic film 81 are united with the polyethylene foaming board 80, thereby increasing bonding surfaces between the plastic film 81 and the polyethylene foaming board 80. The bottom of the base plate can also be overlaid by another plastic film.

The present invention is not restricted to be used in slider. It can also be used as a surfing board. Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extend indicated by the broad general meaning of the terms in which the appended claims are expressed.

I claim:

1. A slider comprising:
    a polyethylene foaming board having a top surface, a bottom surface and edge surfaces; and
    a composite plastic film encapsulating and bonding with said polyethylene foaming board;
    said composite plastic film including an outer film comprising an inner surface having a pattern thereon;
    said outer film being pervious to light; and an inner film comprising an outer surface and an inner surface, said outer surface of said inner film bonded with said inner surface of said outer film, said inner surface of said inner film bonded with said polyethylene foaming board;
    wherein said outer film has a thickness selected from a range of thicknesses between 0.02 mm to 0.15 mm and said inner film has a thickness selected from a range of thicknesses between 0.01 mm to 0.15 mm;
    said composite plastic film having concaves on both sides, said concaves on an inner side of said composite plastic film bonded to said polyethylene foaming board.

2. A slider comprising:
    a polyethylene foaming board having a top surface, a bottom surface and edge surfaces;
    a first polyethylene foaming skin comprising: an inner surface bonded with said top surface and said edge surfaces of said polyethylene foaming board; and an outer surface, said first polyethylene foaming skin has a density greater than a foaming rate of said polyethylene foaming board;
    a first plastic film bonded with said outer surface of said first polyethylene foaming skin;
    a second polyethylene foaming skin comprising: an inner surface bonded with said bottom surface of said polyethylene foaming board; and an outer surface, said second polyethylene foaming skin having a density greater than said foaming rate of said polyethylene foaming board; and
    a second plastic film bonded with said outer surface of said second polyethyle foaming skin.

3. The slider of claim 2 wherein said first plastic film has a thickness ranges from 0.02 mm to 0.15 mm and said second plastic film has a thickness ranges from 0.3 mm to 1.5 mm.

4. The slider of claim 2 wherein said first plastic film comprising:
    an outer film comprising an inner surface having a pattern thereon, said outer film is pervious to light;
    an inner film comprising an outer surface and an inner surface, said outer surface of said inner film is bonded with said inner surface of said outer film, said inner surface of said inner film is bonded with said first polyethylene foaming skin.

5. The slider of claim 4 wherein said outer film together with said inner film having plural concaves on an outer surface of said outer film and on said inner surface of said inner film, said concaves are united with said polyethylene foaming skin.

6. The slider of claim 4 wherein said outer film has a thickness greater than a thickness of said inner film, wherein said thickness of said outer film ranges from 0.02 mm to 0.15 mm, said thickness of said inner film ranges from 0.01 mm to 0.15 mm.

7. The slider of claim 4 wherein said second plastic film comprising:
    a second outer film comprising an inner surface having a second pattern thereon said outer film is pervious to light;
    a second inner film comprising an outer surface and an inner surface, said outer surface of said second inner film is bonded with said inner surface of said second outer film, said inner surface of said second inner film is bonded with said second polyethylene foaming skin.

8. The slider of claim 7 wherein said second plastic film has a thickness ranging from 0.3 mm to 1.5 mm.

9. A slider comprising:
   a polyethylene foaming board having a top surface, a bottom surface and edge surfaces; and
   a polyethylene foaming skin bonded to said top surface and edge surfaces of said polyethylene foaming board;
   a first plastic film interfacing a top surface of said polyethylene foaming skin;
      a second plastic film overlying said bottom surface of said polyethylene foaming board;
      said second plastic film having a greater thickness than said first plastic film;
      said second plastic film having a thickness selected from a range of thickness from 0.3 mm to 1.5 mm.

10. A slider comprising:
    a polyethylene foaming board having a top surface, a bottom surface and edge surfaces; and
    a polyethylene foaming skin bonded to said bottom surface of said polyethylene foaming board;
    a first plastic film overlying said top surface, said edge surfaces of said polyethylene foaming board;
       a second plastic film interfacing said bottom surface of said polyethylene foaming skin;
       said second plastic film having a greater thickness than said first plastic film;
       said second plastic film having a thickness selected from a range of thickness from 0.3 mm to 1.5 mm.

11. The slider of claim 10 wherein said first plastic film comprises:
    a first outer film comprising an inner surface having a first pattern thereon, said first outer film being pervious to light;
    a first inner film comprising an outer surface and an inner surface, said outer surface of said first inner film is bonded with said inner surface of said first outer film, said inner surface of said first inner film is bonded with said polyethylene foaming board.

12. The slider of claim 11 wherein said first outer film together with said first inner film has plural concaves on an outer surface of said first outer film, and on said inner surface of said first inner film, said concaves on said inner surface of said first inner film are united with said polyethylene foaming board.

13. The slider of claim 11 wherein said first outer film has a thickness greater than a thickness of said first inner film, wherein said thickness of said first outer film ranges from 0.02 mm to 0.15 mm, said thickness of said first inner film ranges from 0.01 mm to said 0.15 mm.

* * * * *

(12) EX PARTE REEXAMINATION CERTIFICATE (5984th)
United States Patent
Yeh (10) Number: US 6,955,576 C1
(45) Certificate Issued: Oct. 30, 2007

(54) SLIDER

(76) Inventor: Tzong In Yeh, 4566 Crestwood St., Fremont, CA (US) 94538

Reexamination Request:
No. 90/007,893, Jan. 18, 2006

Reexamination Certificate for:
Patent No.: 6,955,576
Issued: Oct. 18, 2005
Appl. No.: 10/386,634
Filed: Mar. 13, 2003

Related U.S. Application Data (63) Continuation-in-part of application No. 10/040,404, filed on Jan. 9, 2002, now abandoned.

(51) Int. Cl.
*B63B 1/00* (2006.01)

(52) U.S. Cl. .......................................... 441/65; 441/74
(58) Field of Classification Search ................. 441/65, 441/70, 74
See application file for complete search history.

(56) References Cited

U.S. PATENT DOCUMENTS

| | | | | |
|---|---|---|---|---|
| 4,740,258 A | * | 4/1988 | Breitscheidel | 156/209 |
| 4,850,913 A | * | 7/1989 | Szabad, Jr. | 441/65 |
| 4,867,826 A | * | 9/1989 | Wayte | 156/219 |
| 5,211,593 A | * | 5/1993 | Schneider et al. | 441/65 |
| 5,238,434 A | * | 8/1993 | Moran | 441/74 |
| 5,658,179 A | * | 8/1997 | Glydon et al. | 441/74 |
| 6,358,599 B1 | * | 3/2002 | Deibel et al. | 428/319.3 |
| 6,773,798 B2 | * | 8/2004 | Ramesh | 428/319.3 |
| 2002/0167136 A1 | * | 11/2002 | Lehr et al. | 280/28 |

FOREIGN PATENT DOCUMENTS

| | | | |
|---|---|---|---|
| JP | 55-011877 | * | 1/1980 |
| JP | 02-069228 | * | 3/1990 |
| JP | 10-315326 | * | 12/1998 |

* cited by examiner

*Primary Examiner*—Jimmy G. Foster (57) ABSTRACT

A slider that can resist corrosion of moisture, dirt and ultraviolet of sunlight and prevent the pattern therein from wear and tear. The slider also provides a smooth touching feeling to users. The slider mainly containing: a polyethylene foaming board, a first polyethylene foaming skin, a first plastic film, a second polyethylene foaming skin and a second plastic film. The polyethylene foaming board having a top surface, a bottom surface and edge surfaces. The first polyethylene foaming skin contains an inner surface and an outer surface. The inner surface of the first polyethylene foaming skin is bonded with the top surface and the edge surfaces of the polyethylene foaming board. The first polyethylene foaming skin has a foaming rate less than a foaming rate of the polyethylene foaming board. The first plastic film is bonded with the outer surface of the first polyethylene foaming skin. The second polyethylene foaming skin contains an inner surface and an outer surface. The inner surface of the second polyethylene foaming skin is bonded with the bottom surface of the polyethylene foaming board. The second polyethylene foaming skin has a foaming rate less than the foaming rate of the polyethylene foaming board. The second plastic film is bonded with the outer surface of the second polyethylene foaming skin.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 9–13 is confirmed.

Claims 2–4 and 6 are cancelled.

Claims 5 and 7 are determined to be patentable as amended.

Claim 8, dependent on an amended claim, is determined to be patentable.

5. [The slider of claim 4] *A slider comprising:*
   *a polyethylene foaming board having a top surface, a bottom surface and edge surfaces;*
   *a first polyethylene foaming skin comprising: an inner surface bonded with said top surface and edge surfaces of said polyethylene foaming board; and an outer surface, said first polyethylene foaming skin has a density greater than a foaming rate of said polyethylene foaming board;*
   *a first plastic film bonded with said outer surface of said first polyethylene foaming skin, wherein said first plastic film comprising: an outer film comprising an inner surface having a pattern thereon, said outer film is pervious to light; an inner film comprising an outer surface and an inner surface, said outer surface of said inner film is bonded with said inner surface of said outer film, said inner surface of said inner film is bonded with said first polyethylene foaming skin;*
   *a second polyethylene foaming skin comprising: an inner surface bonded with said bottom surface of said polyethylene foaming board; and an outer surface, said second polyethylene foaming skin having a density greater than said foaming rate of said polyethylene foaming board; and*
   *a second plastic film bonded with said outer surface of said second polyethylene foaming skin;*
   wherein said outer film together with said inner film having plural concaves on an outer surface of said outer film and on said inner surface of said inner film, said concaves are united with said polyethylene foaming skin.

7. [The slider of claim 4] *A slider comprising:*
   *a polyethylene foaming board having a top surface, a bottom surface and edge surfaces;*
   *a first polyethylene foaming skin comprising: an inner surface bonded with said top surface and edge surfaces of said polyethylene foaming board; and an outer surface, said first polyethylene foaming skin has a density greater than a foaming rate of said polyethylene foaming board;*
   *a first plastic film bonded with said outer surface of said first polyethylene foaming skin, wherein said first plastic film comprising: an outer film comprising an inner surface having a pattern thereon, said outer film is pervious to light; an inner film comprising an outer surface and an inner surface, said outer surface of said inner film is bonded with said inner surface of said outer film, said inner surface of said inner film is bonded with said first polyethylene foaming skin;*
   *a second polyethylene foaming skin comprising: an inner surface bonded with said bottom surface of said polyethylene foaming board; and an outer surface, said second polyethylene foaming skin having a density greater than said foaming rate of said polyethylene foaming board; and*
   *a second plastic film bonded with said outer surface of said second polyethylene foaming skin; wherein said second plastic film comprising:*
   *a second outer film comprising an inner surface having a second pattern thereon said outer film is pervious to light;*
   *a second inner film comprising an outer surface and an inner surface, said outer surface of said second inner film is bonded with said inner surface of said second outer film, said inner surface of said second inner film is bonded with said second polyethylene foaming skin.*

\* \* \* \* \*

(12) EX PARTE REEXAMINATION CERTIFICATE (6499th)
United States Patent
Yeh (10) Number: US 6,955,576 C2
(45) Certificate Issued: Oct. 28, 2008

(54) SLIDER

(76) Inventor: Tzong In Yeh, 4566 Crestwood St., Fremont, CA (US) 94538

Reexamination Request:
No. 90/008,611, Apr. 26, 2007

Reexamination Certificate for:
Patent No.: 6,955,576
Issued: Oct. 18, 2005
Appl. No.: 10/386,634
Filed: Mar. 13, 2003

Reexamination Certificate C1 6,955,576 issued Oct. 30, 2007

Related U.S. Application Data

(63) Continuation-in-part of application No. 10/040,404, filed on Jan. 9, 2002, now abandoned.

(51) Int. Cl.
*B63B 1/00* (2006.01)

(52) U.S. Cl. .............................. 441/65; 441/74
(58) Field of Classification Search .............. 441/65, 441/174
See application file for complete search history.

(56) References Cited

U.S. PATENT DOCUMENTS

| | | | | |
|---|---|---|---|---|
| 4,270,768 A | * | 6/1981 | Nakanishi | 280/610 |
| 4,850,913 A | * | 7/1989 | Szabad, Jr. | 441/65 |
| 5,128,196 A | * | 7/1992 | Luetkens et al. | 428/213 |
| 5,206,075 A | * | 4/1993 | Hodgson, Jr. | 428/216 |
| 5,211,593 A | * | 5/1993 | Schneider et al. | 441/65 |
| 5,238,434 A | * | 8/1993 | Moran | 441/74 |
| 5,275,860 A | * | 1/1994 | D'Luzansky et al. | 428/71 |
| 5,503,921 A | * | 4/1996 | Chang et al. | 428/308.4 |
| 6,106,345 A | * | 8/2000 | Yeh | 441/65 |
| 6,358,599 B1 | * | 3/2002 | Deibel et al. | 428/319.3 |
| 6,773,798 B2 | * | 8/2004 | Ramesh | 428/319.3 |
| 6,908,351 B2 | * | 6/2005 | Burke | 441/65 |
| 2002/0167136 A1 | * | 11/2002 | Lehr et al. | 280/28 |
| 2004/0096626 A1 | * | 5/2004 | Azevedo | 428/136 |

FOREIGN PATENT DOCUMENTS

| | | | | |
|---|---|---|---|---|
| CN | 1233559 A | * | 11/1999 | |
| JP | 2000-117868 | * | 4/2000 | |
| KR | 96-4105 | * | 3/1996 | |

* cited by examiner

*Primary Examiner*—Jimmy Foster (57) ABSTRACT

A slider that can resist corrosion of moisture, dirt and ultra-violet of sunlight and prevent the pattern therein from wear and tear. The slider also provides a smooth touching feeling to users. The slider mainly containing: a polyethylene foaming board, a first polyethylene foaming skin, a first plastic film, a second polyethylene foaming skin and a second plastic film. The polyethylene foaming board having a top surface, a bottom surface and edge surfaces. The first polyethylene foaming skin contains an inner surface and an outer surface. The inner surface of the first polyethylene foaming skin is bonded with the top surface and the edge surfaces of the polyethylene foaming board. The first polyethylene foaming skin has a foaming rate less than a foaming rate of the polyethylene foaming board. The first plastic film is bonded with the outer surface of the first polyethylene foaming skin. The second polyethylene foaming skin contains an inner surface and an outer surface. The inner surface of the second polyethylene foaming skin is bonded with the bottom surface of the polyethylene foaming board. The second polyethylene foaming skin has a foaming rate less than the foaming rate of the polyethylene foaming board. The second plastic film is bonded with the outer surface of the second polyethylene foaming skin.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 9–13 is confirmed.

Claims 2–4 and 6 were previously cancelled.

Claims 5 and 7 are determined to be patentable as amended.

Claim 8, dependent on an amended claim, is determined to be patentable.

5. A slider comprising:
  a polyethylene foaming board having a top surface, a bottom surface and edge surfaces;
  a first polyethylene foaming skin comprising[:] an inner surface bonded with said top surface and *said* edge surfaces of said polyethylene foaming board[;] and an outer surface, *and* said first polyethylene foaming skin [has] *having* a density greater than [a foaming rate] *that* of said polyethylene foaming board; a first plastic film bonded with said outer surface of said first polyethylene foaming skin, wherein said first plastic film comprising: an outer film comprising an inner surface having a pattern *printed* thereon, said outer film is pervious to light; an inner film comprising an outer surface and an inner surface, said outer surface of said inner film is bonded with said inner surface of said outer film, said inner surface of said inner film is bonded with said first polyethylene foaming skin;
  a second polyethylene foaming skin comprising[:] an inner surface bonded with said bottom surface of said polyethylene foaming board[;] and an outer surface, *and* said second polyethylene foaming skin having a density greater than [said foaming rate] *that* of said polyethylene foaming board; and
  a second plastic film bonded with said outer surface of said second polyethylene foaming skin, *said second plastic film being thicker than said first plastic film*;
  wherein said outer film together with said inner film having plural concaves on an outer surface of said outer film and on said inner surface of said inner film, *so as to increase a bonding surface between said inner film and said polyethylene foaming skin,* said concaves are united with said polyethylene foaming skin.

7. A slider comprising:
  a polyethylene foaming board having a top surface, a bottom surface and edge surfaces;
  a first polyethylene foaming skin comprising[:] an inner surface bonded with said top surface and *said* edge surfaces of said polyethylene foaming board[;] and an outer surface, *and* said first polyethylene foaming skin [has] *having* a density greater than [a foaming rate] *that* of said polyethylene foaming board;
  a first plastic film bonded with said outer surface of said first polyethylene foaming skin, wherein said first plastic film comprising: an outer film comprising an inner surface having a pattern *printed* thereon, said outer film is pervious to light; an inner film comprising an outer surface and an inner surface, said outer surface of said inner film is bonded with said inner surface of said outer film, said inner surface of said inner film is bonded with said first polyethylene foaming skin; *and said inner film together with said outer film defining plural concaves in both sides so as to increase a bonding surface between said inner film and said first polyethylene foaming skin; and*
  a second polyethylene foaming skin comprising[:] an inner surface bonded with said bottom surface of said polyethylene foaming board[;] and an outer surface, *and* said second polyethylene foaming skin having a density greater than [said foaming rate] *that* of said polyethylene foaming board; and
  a second plastic film bonded with said outer surface of said second polyethylene foaming skin, *said second plastic film being thicker than said first plastic film*; wherein said second plastic film comprising:
    a second outer film comprising an inner surface having a second pattern thereon, said outer film is pervious to light;
    a second inner film comprising an outer surface and an inner surface, said outer surface of said second inner film is bonded with said inner surface of said second outer film, said inner surface of said second inner film is bonded with said second polyethylene foaming skin.

* * * * *

/

(12) EX PARTE REEXAMINATION CERTIFICATE (8567th)
United States Patent
Yeh (10) Number: US 6,955,576 C3
(45) Certificate Issued: Sep. 20, 2011

(54) SLIDER

(76) Inventor: Tzong In Yeh, Fremont, CA (US)

Reexamination Request:
No. 90/011,118, Jul. 27, 2010

Reexamination Certificate for:
Patent No.: 6,955,576
Issued: Oct. 18, 2005
Appl. No.: 10/386,634
Filed: Mar. 13, 2003

Reexamination Certificate C1 6,955,576 issued Oct. 30, 2007

Reexamination Certificate C2 6,955,576 issued Oct. 28, 2008

Related U.S. Application Data

(63) Continuation-in-part of application No. 10/040,404, filed on Jan. 9, 2002, now abandoned.

(51) Int. Cl.
*B63B 1/00* (2006.01)

(52) U.S. Cl. .......................................... 441/65; 441/74
(58) Field of Classification Search ........................ None
See application file for complete search history.

(56) References Cited

U.S. PATENT DOCUMENTS

| | | | |
|---|---|---|---|
| 4,270,768 A | 6/1981 | Nakanishi | 280/610 |
| 4,850,913 A | 7/1989 | Szabad | 441/65 |
| 5,211,593 A | 5/1993 | Schneider | 441/65 |
| 5,503,921 A | 4/1996 | Chang | 428/308.4 |

FOREIGN PATENT DOCUMENTS

| | | |
|---|---|---|
| JP | 8-318 569 | 12/1996 |
| JP | 2000-117868 | 2/1998 |
| KR | 96-4105 | 2/1996 |

OTHER PUBLICATIONS

Azevedo US2004/0096626 Layered Structures with Enhanced Properties (filed Nov. 14, 2002).

*Primary Examiner* — Joseph A. Kaufman (57) ABSTRACT

A slider that can resist corrosion of moisture, dirt and ultraviolet of sunlight and prevent the pattern therein from wear and tear. The slider also provides a smooth touching feeling to users. The slider mainly containing: a polyethylene foaming board, a first polyethylene foaming skin, a first plastic film, a second polyethylene foaming skin and a second plastic film. The polyethylene foaming board having a top surface, a bottom surface and edge surfaces. The first polyethylene foaming skin contains an inner surface and an outer surface. The inner surface of the first polyethylene foaming skin is bonded with the top surface and the edge surfaces of the polyethylene foaming board. The first polyethylene foaming skin has a foaming rate less than a foaming rate of the polyethylene foaming board. The first plastic film is bonded with the outer surface of the first polyethylene foaming skin. The second polyethylene foaming skin contains an inner surface and an outer surface. The inner surface of the second polyethylene foaming skin is bonded with the bottom surface of the polyethylene foaming board. The second polyethylene foaming skin has a foaming rate less than the foaming rate of the polyethylene foaming board. The second plastic film is bonded with the outer surface of the second polyethylene foaming skin.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 5, 7, 8 and 12 is confirmed.
Claims 2-4 and 6 were previously cancelled.
Claim 1 is cancelled.
Claims 9-11 and 13 were not reexamined.

\* \* \* \* \*